United States Patent [19]

Sado

[11] 4,206,458
[45] Jun. 3, 1980

[54] NUMERICAL DISPLAY SYSTEM FOR ELECTRONIC INSTRUMENT

[75] Inventor: Ichiro Sado, Tokyo, Japan

[73] Assignee: Canon Kabushiki Kaisha, Tokyo, Japan

[21] Appl. No.: 947,197

[22] Filed: Sep. 29, 1978

Related U.S. Application Data

[63] Continuation of Ser. No. 762,196, Jan. 24, 1977, abandoned.

[30] Foreign Application Priority Data

Jan. 28, 1976 [JP] Japan .................................. 51-8091
Jan. 28, 1976 [JP] Japan .................................. 51-8093

[51] Int. Cl.² ............................................ G06K 15/18
[52] U.S. Cl. .................................... 340/756; 368/10; 368/217; 368/239; 340/789; 364/711
[58] Field of Search ................. 340/756, 811, 789; 58/4 A, 50 R; 364/711

[56] References Cited

U.S. PATENT DOCUMENTS

| | | | |
|---|---|---|---|
| 3,749,896 | 7/1973 | Munt | 340/756 X |
| 3,788,058 | 1/1974 | Idei et al. | 58/50 R |
| 3,813,533 | 5/1974 | Cone et al. | 58/50 R |
| 3,816,730 | 6/1974 | Yamamoto et al. | 58/50 R |
| 3,875,386 | 4/1975 | Tsuiki et al. | 340/803 X |
| 3,956,744 | 5/1976 | Sado et al. | 340/814 |
| 4,060,971 | 12/1977 | O'Connor et al. | 58/4 A |

*Primary Examiner*—David L. Trafton
*Attorney, Agent, or Firm*—Fitzpatrick, Cella, Harper & Scinto

[57] ABSTRACT

A numerical display system for electronic instrument comprises output means capable of displaying or printing a plurality of numbers different in unit or number system, numeric data storage means for supplying numeric data to the output means, and means for controlling the supply of the numeric data stored in the storage means to the output means and for controlling to suppress the output of zero in each of the numbers different in unit or number system contained in the numeric data to be displayed or printed.

10 Claims, 11 Drawing Figures

DISPLAY EXAMPLE TIME 00-01-30

DISPLAY EXAMPLE TIME 10-00-01

←— TIMING

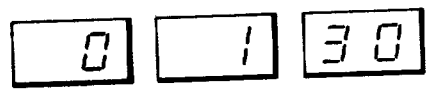
FIG. 3 A DISPLAY EXAMPLE TIME 00-01-30
FIG. 3 B DISPLAY EXAMPLE TIME 10-00-01
FIG. 4
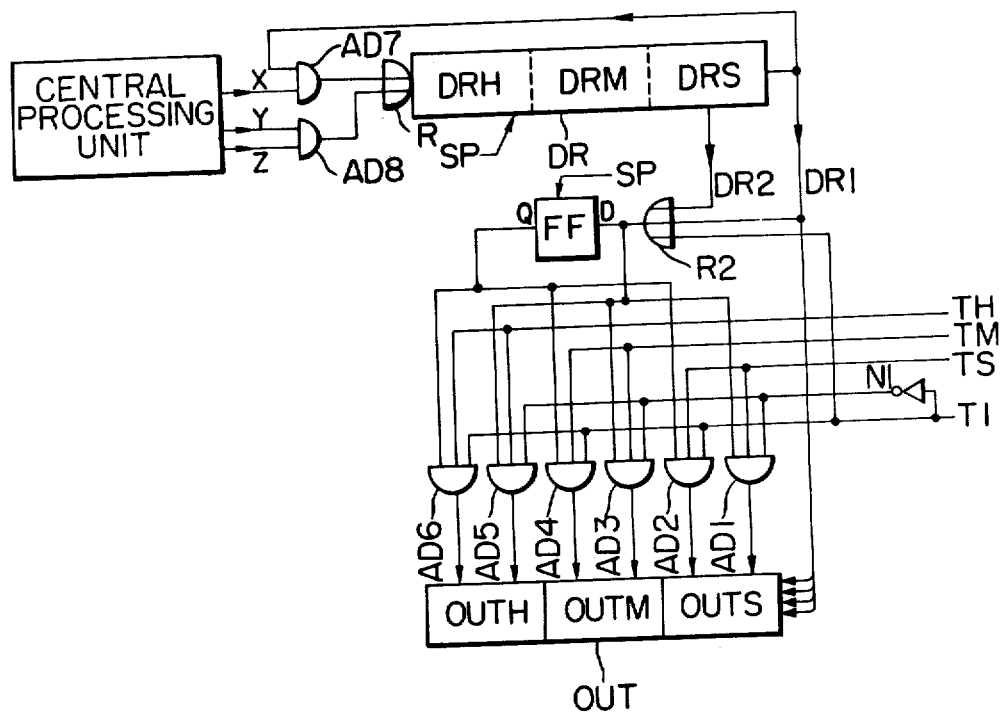

FIG. 5
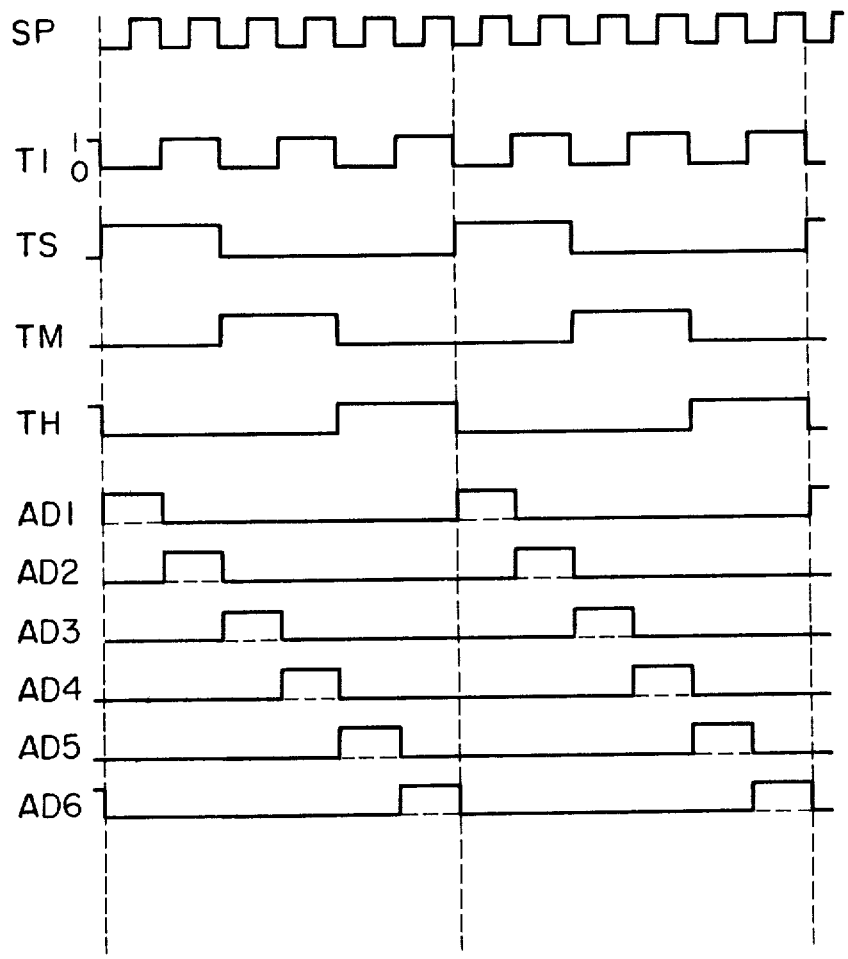
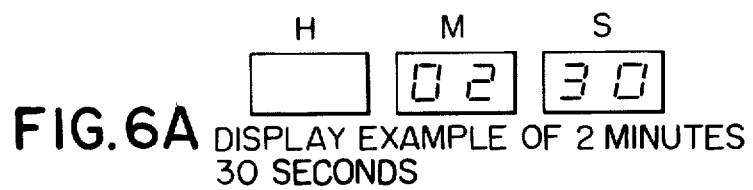
FIG. 6A DISPLAY EXAMPLE OF 2 MINUTES 30 SECONDS
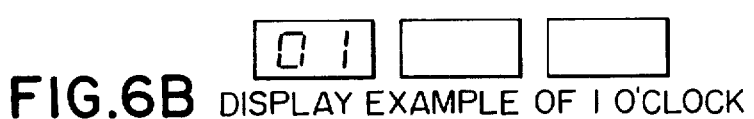
FIG. 6B DISPLAY EXAMPLE OF 1 O'CLOCK
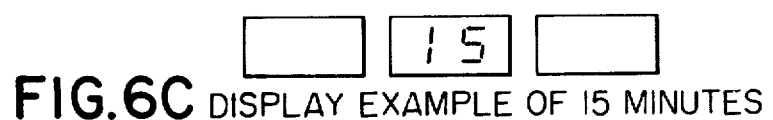
FIG. 6C DISPLAY EXAMPLE OF 15 MINUTES

NUMERICAL DISPLAY SYSTEM FOR ELECTRONIC INSTRUMENT

This is a continuation of application Ser. No. 762,196 filed Jan. 24, 1977, now abandoned.

BACKGROUND OF THE INVENTION a. Field of the Invention

This invention relates to a numerical display system which is provided with means for selectively suppressing unnecessary zeroes when numbers different in unit or number system are to be displayed or printed in parallel fashion on a display or printing device having a plurality of digits, and more particularly to a numerical display system for electronic instrument whereby display of zeroes in a plurality of adjacent digits is suppressed once those zeroes have been found to be unnecessary zeroes. Thus, this invention relates to improvements in the numerical display system for electronic instrument.

b. Description of the Prior Art

The zero suppress system heretofore commonly known is such that unnecessary zeroes in a numeral are discriminated in succession from the most significant digit to the least significant digit. Such zero suppress system, however, causes confusion when it displays in parallel fashion some special numbers, for example, numbers of the sexagesimal system or the duodecimal system or numbers of the decimal system representing different units such as Yen and Sen (units of the Japanese currency), meter and centimeter, and other measures and weights. Where numbers of the sexagesimal system, for example, numbers representing the time such as 0-01-30 (0 o'clock 1 minute 30 seconds) are to be displayed, it is desired that the 0 representing the hour be displayed for the purpose of confirmation but the 0 in the 01 representing the minute be rather unnecessary while the 0 in the 30 representing the second be displayed.

SUMMARY OF THE INVENTION

An object of the present invention is to provide a numerical display system improved with the above-noted point in view.

According to the present invention, the numerical display system for an electronic instrument comprises output means capable of displaying or printing a plurality of numbers different in unit or number system, numeric data storage means for supplying numeric data to the output means, and means for controlling the supply of the numeric data stored in the storage means to the output means and for controlling to suppress the output of zero in each of the numbers different in unit or number system contained in the numeric data to be displayed or printed.

The invention will become more fully apparent from the following detailed description thereof taken in conjunction with the accompanying drawings.

BRIEF DESCRIPTION OF THE DRAWINGS

FIGS. 3(A) and (B) show examples of the display effected by the embodiment shown in FIG. 1;

FIG. 4 is a block diagram showing another embodiment of the present invention.

FIG. 5 is a timing chart illustrating the operation of the embodiment shown in FIG. 4;

FIGS. 6(A), (B) and (C) show examples of the display effected by the embodiment shown in FIG. 4;

DESCRIPTION OF THE PREFERRED EMBODIMENTS

Figure 1:
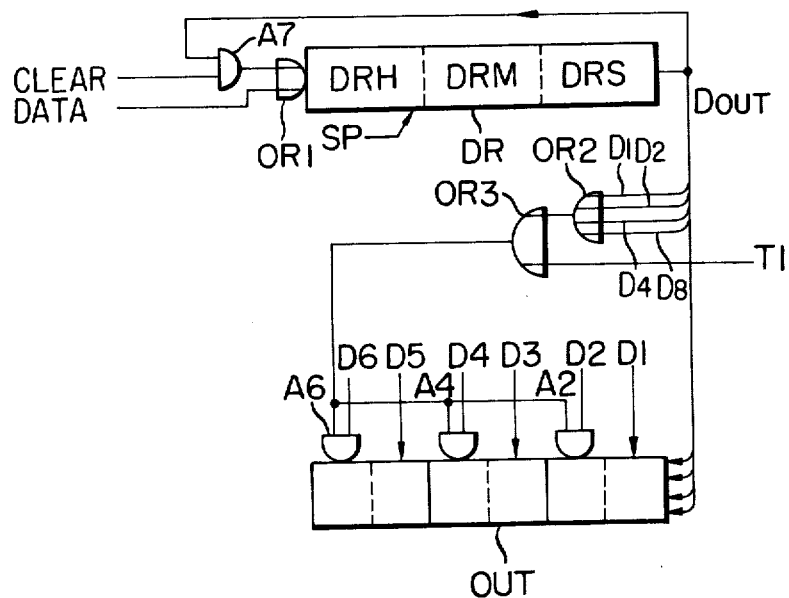
FIG. 1 is a block diagram showing an embodiment of the present invention.

Referring to FIG. 1 which is a block diagram showing an embodiment of the present invention, it employs, for example, the dynamic display system as disclosed in U.S. Pat. No. 3,646,544, and includes a circulating register DR for storing data to be displayed. The register DR is one having six digits (four bits parallel configuration, namely, two digits for hour, two digits for minute and two digits for second, in which shift occurs upon falling of SP (shift pulse). At the time D1 (see FIG. 2), DRS stores the data of second, DRM the data of minute and DRH the data of hour, in the manner as shown.

Designated by A7 is an AND gate, and the register DR is cleared when the clear signal (CLEAR) has become logical 0. Signal DATA representing the data to be displayed which comes from a central processing unit or the like is passed through an OR gate OR1 and stored in the register DR.

An OR gate OR2 is provided to discriminate the codes weighted 1, 2, 4 and 8 from the register DR simultaneously. The gate OR2 is such that the output thereof becomes logical 0 only when the data of all the four bits have become logical 0.

An OR gate OR3 is also provided. The timing T1 (see FIG. 2) entering this OR gate OR3 is designed such that the output thereof becomes logical 1 when the less significant digit representing each of hour, minute and second appears at the output DOUT of the register DR and that the output thereof becomes logical 0 when the more significant digit representing each of hour, minute and second appears at the output DOUT.

The output of the OR gate OR3 is applied to AND gates A2, A4 and A6, with the driving pulses D2, D4 and D6 for the more significant digits representing the hour, minute and second, and the outputs of the AND gates A2, A4 and A6 are supplied to a display device OUT as the driving pulses for the more significant digits representing the hour, minute and second.

D1-D6 are put out in synchronism with the contents of DOUT. Of these, D1, D3 and D5 are used directly as the digit driving pulses for the first, third and fifth digits of the display device.

FIGS. 3(A) and 3(B) show examples of the display effected by the display system described above. Description will now be made of the operation necessary for obtaining the display as shown in FIG. 3(A). Since the time 00-01-30 is put out in the manner as shown at DOUT in FIG. 2, the output of the OR gate OR2 becomes 0.1.1.0.0.0 and T1 changes to 1.0.1.0.1.0, so that the output of the OR gate OR3 changes to 1.1.1.0.1.0, as the result of which D4 and D6 are inhibited by the AND gates A4 and A6 and thus, there is obtained the display as shown in FIG. 3(A). As for FIG. 3(B), the output of the OR gate OR3 changes to 1.0.1.0.1.1 so that D2 and D4 are inhibited by the AND gates A2 and A4 and thus, there is obtained the display as shown in FIG. 3(B).

As will be seen from what has been described above with respect to the examples of the display in which numbers meaning different units at every other digit are displayed, display of numbers meaning different units at every two digits, for example, may also be readily realized by adding such a timing and inhibiting circuit that T1 becomes logical 1 for every two digits.

The present system is useful not only for the display of time but also for the display of angle (degree, minute and second) and other various notations such as metric system, yard system, avoirdupois system, etc.

FIG. 4 is a block diagram showing another embodiment of the present invention. It includes a central processing unit B, AND gates AD1-AD8, OR gates R1, R2 nd inverter N1. Display register DR is similar to that in the previous embodiment, that is, it has six digits, namely, two digits for the data of hour (DRH), two digits for the data of minute (DRM) and two digits for the data of second (DRS) and circulation occurs in these six digits (shift occurs upon falling of the shift pulse SP). Designated by FF is a 1-bit flip-flop which, upon arrival of a logical 1 signal at the input D, puts out a logical 1 signal with a delay of 1-bit. OUT includes a display device and a driver circuit therefor. OUTS designates display digits for the unit of seconds, and the output of the AND gate AD1 provides a driving pulse for the less significant digit representing the second while the output of the AND gate AD2 provides a driving pulse for the more significant digit representing the second. OUTM designates display digits for the unit of minute, and the output of the AND gate AD3 provides a driving pulse for the less significant digit representing the minute while the output of the AND gate AD4 provides a driving pulse for the more significant digit representing the minute. OUTH designates display digits for the unit of hour, and the output of the AND gate AD5 provides a driving pulse for the less significant digit representing the unit of hour while the output of the AND gate AD6 provides a driving pulse for the more significant digit representing the unit of hour. As the data used for the conventional dynamic drive display, the output of the circulating register DR is intactly applied to the display device OUT, which thus effects display with the aid of a decoder contained within the display device OUT.

Again in the present embodiment, it should be understood that the data are in the form of 1248 code and stored in parallel fashion.

The output signal line X from the central processing unit is a line through which the clear signal is applied, Y is a signal line through which the data to be displayed are stored in the register DR, and Z is a line for timing signals.

FIG. 5 is a timing chart for the embodiment of FIG. 4. In synchronism with the register DR which circulates for a 6-bit time, timing signals T1, TS, TM and TH as shown are generated by a control section (not shown). It should be understood that the 2-bits time of the signal TS is coincident with the timing at which the data in the digits DRS for the data of second within the register R passes through the AND gate AD7.

Operation of the circuit will hereinafter be described with respect to the example of the display shown in FIG. 6(A).

Figure 2:
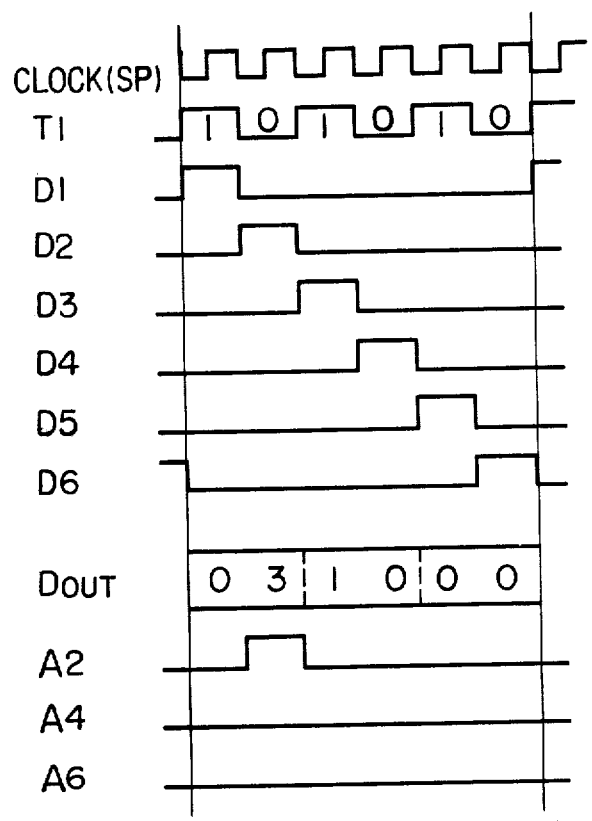
FIG. 2 is a timing chart illustrating the operation of the embodiment shown in FIG. 1.

FIG. 6(A) shows an example of the display in which the time 2 minutes 30 seconds is displayed. In this case, data 032000 are applied into the register DR from the central processing unit in the named order. Accordingly, in the register DR, 000230 are stored from left to right. During the first 1-bit time (TS·$\overline{T1}$ in FIG. 5) after the storage, the output DR1 of the register DR is logical 0 and the output DR2 of the register DR which has been continued since 1-bit before is logical 1. (However, DR1 and DR2 are parallel 4-bits and therefore, these are four OR signals.) Consequently, during the time TS·$\overline{T1}$, the output of the OR gate R2 is logical 1 and thus, the output of the AND gate AD1 becomes logical 1 and a FIG. 0 is displayed in the less significant digit of OUTS. Next, during the second bit time TS·T1, the flip-flop FF puts out logical 1 and thus, the output of the AND gate AD2 becomes logical 1 and a FIG. 1 is displayed in the more significant digit of OUTS while the AND gate AD1 does not put out logical 1 since the output of N1 is logical 0. At the same time, the output of the OR gate R2 unconditionally becomes logical 1 since T1 is logical 1. The meaning of the T1 applied to the OR gate R2 is to neglect the time at which the less significant digit representing the minute and the more significant digit representing the second or the more significant digit representing the minute and the less significant digit representing the hour appears for the time T1 even when both DR1 and DR2 are logical 0. Next, during the third bit time TM·$\overline{T1}$, DR1 is logical 1 and DR2 is logical 0, so that the output of the OR gate R2 becomes logical 1 and consequently, the output of the AND gate AD3 becomes logical 1, whereby a FIG. 2 is displayed in the less significant digit of OUTM. Next, during the time TM·T1, the output Q of the flip-flop FF is logical 1 so that the output of the AND gate AD4 becomes logical 1, whereby a FIG. 0 is displayed in the more significant digit of OUTM. Next, during the time TH·$\overline{T1}$, DR1, DR2 and T1 are logical 0 so that the output of the OR gate R1 becomes logical 0 and at the same time, the output of the AND gate AD5 becomes logical 0 and thus, nothing is displayed this time.

Next, during the time TH·T1, the output Q of the flip-flop FF becomes logical 0 so that the output of the AND gate AD6 becomes logical 0 and thus, nothing is displayed again in this case.

The above-described sequence of operation is repeated with a result that the display as shown in FIG. 6(A) is provided.

As for the display example shown in FIG. 6(B), the units of minute and second are both 0 and accordingly, they are not displayed but the unit of hour alone is displayed. In FIG. 6(C), the units of hour and second are both 0 and accordingly, the unit of minute alone is displayed.

As will be apparent from what has been described hitherto, zero suppression in each three digits, for example, may be readily realized by directing another digit output line to the OR gate OR2 and adding another flip-flop F2. Also, the suppression of more significant digits and less significant digits in each group of digits may be readily realized by a combination of the system of the present invention and the zero suppress system of the prior art. Again, this embodiment is useful not only for the display of time but also for the display of various notations such as angle (degree, minute and second), metric system, yard system, avoirdupois system, etc.

Figure 7:
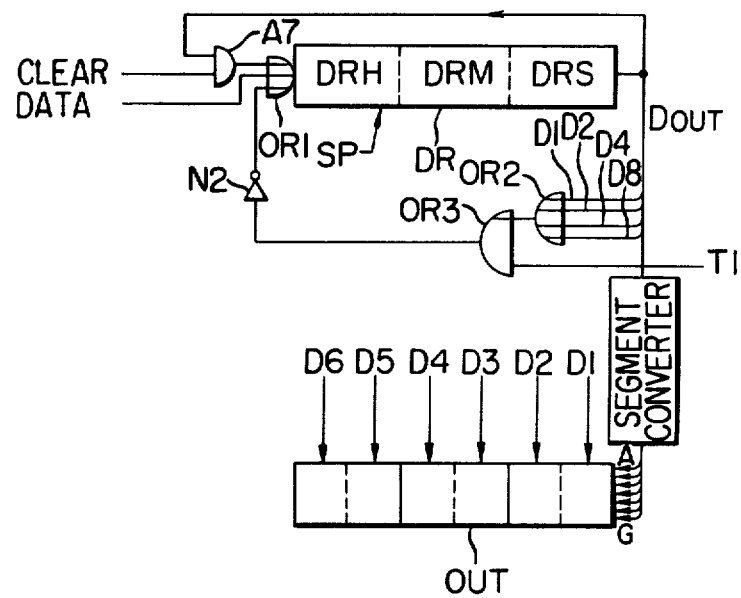
FIGS. 7 and 8 are block diagrams showing modifications of the embodiment shown in FIGS. 1 and 2.
Figure 8:
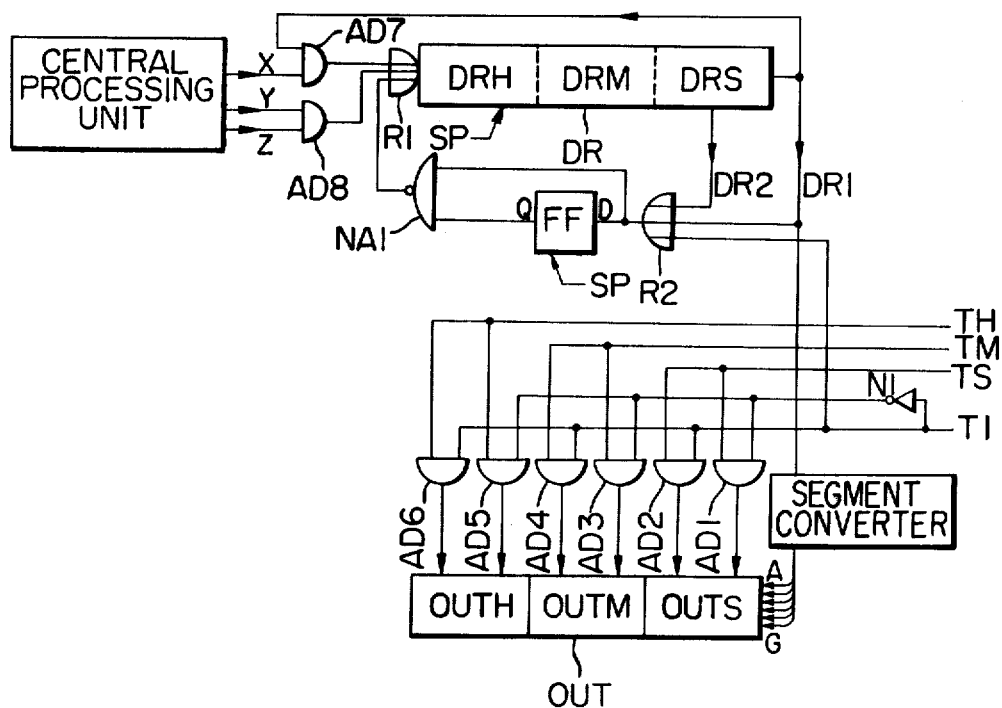

FIGS. 7 and 8 show embodiments in which control is effected on the segment side, rather than the digit side as in the embodiment of FIGS. 1 and 2. In the embodiment of FIG. 7, the display control AND gates A2, A4 and A6 shown in FIG. 1 are eliminated and instead, an inverter N2 is connected to the output of the OR gate OR3 and the output of the inverter N2 is connected to the input terminal of the register DR through the OR gate OR1. Also, a segment converter SC provided within the output device OUT is explicitly shown to help understanding. In such construction, when the display as shown in FIG. 3(A) is desired, zeroes in the least significant digit and the fifth digit from right appear when the timing signal T1 is at high level and therefore, even if the output of the OR gate OR2 is logical 0, the output of the OR gate OR3 becomes logical 1 and accordingly, the output of the inverter N2 also becomes logical 0, whereby no change occurs to the contents stored in the register DR. However, zeroes in the fourth and sixth digits from right in FIG. 3(A) appear when the timing signal T1 is at low level and therefore, all of the inputs to the OR gate OR3 become logical 0 and accordingly, the output of the inverter N2 becomes logical 1 and is stored in the register DR. Since the register Dr is of the design with parallel 4-bits and serial digits, one digit and four bits all become 1, that is, a code 1111 (commonly called F-code) is stored. Since the segment converter SC is not endowed with a decoding capacity, the F-code 1111 is not delivered to the output device OUT and accordingly, there can be provided the display as shown in FIG. 3(A). Likewise, where the display as shown in FIG. 3(B) is desired, no display occurs in the second and fourth digits from right because F-code 1111 is stored in these digits.

In the embodiment of FIG. 8, substantially likewise, the output of NAND gate NA1 is delivered to write F-code 1111 into the register DR only when both digits representing a predetermined unit are 0, whereby any of the displays as shown in FIGS. 6(A), (B), and (C) can be provided.

What I claim is:

1. A numerical display system for an electronic instrument, comprising:
    output means for displaying or printing a plurality of numbers different in unit or number system;
    numeric data storage means for supplying numeric data to said output means; and
    means for controlling the supply of said numeric data from said storage means to said output means and for simultaneously suppressing predetermined zero outputs in each of the numbers of the numeric data to be displayed or printed.

2. A numerical display system according to claim 1, wherein said control means includes means for causing said numeric data in said storage means to be read out of said output means dynamically in a time-division format.

3. A numerical display system according to claim 1, wherein said storage means comprises a register with parallel bits and serial digits.

4. A numerical display system for an electronic instrument, comprising:
    output means for displaying or printing a plurality of numbers different in unit or number system;
    numeric data storage means for supplying numeric data to said output means; and
    control means for controlling the supply of said numeric data from said storage means to said output means, said control means including means for discriminating between each group of numeric data to be displayed or printed and for discriminating each zero digit, and for simultaneously suppressing each unnecessary zero in each displayed or printed number.

5. A numerical display system according to claim 4, wherein said control means includes means for causing said numeric data in said storage means to be read out to said output means dynamically in a time-division format.

6. A numerical display system according to claim 4, wherein said storage means comprises a register with parallel bits and serial digits.

7. A numerical display system for an electronic instrument comprising:
    numeric data storage means having storage locations for storing different units of numeric data;
    output means for displaying or printing the contents of said storage means, said output means having digit cells associated with the storage locations of said numeric storage means;
    a plurality of gate means connected, respectively, to a selected one of the digit cells of said output means, such that at least one gate means is provided for each of the different units of numeric data; and
    control means for applying control signals to said plurality of gate means to discriminate between the necessary and unnecessary output digits of said output means for each unit of numeric data and to suppress unnecessary zero outputs in the associated digit cells,
    thereby providing zero-suppression for each of the different units of numeric data.

8. A numerical display system for an electronic instrument comprising:
    numeric data storage means having storage locations for storing different units of numeric data;
    output means for displaying or printing the contents of said storage means, said output means having digit cells associated with the storage locations of said numeric storage means;
    a plurality of gate means connected respectively to each of the digit cells of said output means; and
    control means for applying control signals to said plurality of gate means to discriminate between necessary and unnecessary output digits of said output means for each unit of the numeric data and to suppress unnecessary zero outputs,
    thereby providing zero-suppression for each unit of numeric data.

9. A numerical display system for an electronic instrument comprising:
    circulating shift register means having storage locations for storing different units of numeric data;
    output means for displaying or printing the contents of said register means, said output means having digit cells associated with the storage locations of said register means;
    OR gate means for receiving the numeric data from said register means, and for receiving a timing signal which alternates between high level and low level states for each successive digit; and
    inverter means for inverting the output signal from said OR gate means and for applying the inverted signal to said register means as a code signal incapable of being visualized by said output means.

10. A numerical display system for an electronic instrument comprising:
    circulating shift register means having storage locations for storing different units of numeric data;
    output means for displaying or printing the contents of said register means, said output means having digit cells associated with the storage locations of said register means;

a plurality of gate means corresponding respectively to each of the digit cells of said output means;

OR gate means for receiving the numeric data from said register means, and for receiving a timing signal which alternates high and low level states for each successive digit; and control means for inverting the output signal from said OR gate means and for applying the inverted signal to said register means as a code signal incapable of being visualized by said output means, said control means cooperating with said plurality of gate means to discriminate between necessary and unnecessary output digits of said output means for each unit of the numeric data.

* * * * *